US010555653B2

(12) United States Patent
Bower et al.

(10) Patent No.: US 10,555,653 B2
(45) Date of Patent: Feb. 11, 2020

(54) DOMESTIC CYCLONIC VACUUM CLEANER

(71) Applicant: Dyson Technology Limited, Wiltshire (GB)

(72) Inventors: Andrew James Bower, Bristol (GB); Alejandro Pedro Martinez, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 183 days.

(21) Appl. No.: 14/878,787

(22) Filed: Oct. 8, 2015

(65) Prior Publication Data

US 2016/0100729 A1  Apr. 14, 2016

(30) Foreign Application Priority Data

Oct. 10, 2014 (GB) .................................. 1417990.7

(51) Int. Cl.
*A47L 9/10* (2006.01)
*A47L 9/16* (2006.01)
(Continued)

(52) U.S. Cl.
CPC ............... *A47L 9/1625* (2013.01); *A47L 9/12* (2013.01); *A47L 9/165* (2013.01); *A47L 9/1641* (2013.01);
(Continued)

(58) Field of Classification Search
CPC ... A47L 9/1641; A47L 9/1625; B01D 50/002; B04C 9/00
(Continued)

(56) References Cited

U.S. PATENT DOCUMENTS 3,865,242 A * 2/1975 Musto ....................... B04C 5/02
209/143
6,332,239 B1 * 12/2001 Dubos ..................... A47L 9/104
15/327.2
(Continued)

FOREIGN PATENT DOCUMENTS

DE  20 2006 016 366   2/2007
EP     1 674 015       6/2006
(Continued)

OTHER PUBLICATIONS

Combined Search and Examination Report dated Mar. 31, 2015, directed to GB Application No. 1417990.7; 2 pages.
(Continued)

*Primary Examiner* — Joseph J Hail
*Assistant Examiner* — Shantese L McDonald
(74) *Attorney, Agent, or Firm* — Morrison & Foerster LLP

(57) ABSTRACT

A cyclonic vacuum cleaner including a suction inlet fluidly connected in series to a vac-motor for drawing a dirty airflow in through the suction inlet. The suction inlet is fluidly connected downstream to both a first cyclonic separator and to a flow device via a flow junction, the flow junction configured for dividing the dirty airflow into two separate airflows, a first airflow passing through the first cyclonic separator and a second airflow passing through the flow device, thus stepping down the dirty airflow through the first separator compared to the dirty airflow through the suction inlet. The flow device is either a second cyclonic separator, an air filter or an air turbine. A screening member is upstream of the flow device for screening out dirt particles from the second airflow so that the dirt particles are retained in the first airflow, thus "concentrating" dust loading in the first airflow.

13 Claims, 5 Drawing Sheets

(51) Int. Cl.
*A47L 9/12* (2006.01)
*B01D 50/00* (2006.01)
*B04C 9/00* (2006.01)

(52) U.S. Cl.
CPC .............. *B01D 50/002* (2013.01); *B04C 9/00* (2013.01); *B04C 2009/002* (2013.01); *B04C 2009/008* (2013.01)

(58) Field of Classification Search
USPC .......................... 15/331, 337, 347, 352, 353
See application file for complete search history.

(56) References Cited

U.S. PATENT DOCUMENTS

| | | | |
|---|---|---|---|
| 7,291,189 | B2 | 11/2007 | Lim et al. |
| 7,517,377 | B2 * | 4/2009 | Yoshida .................. A47L 9/102 55/304 |
| 7,588,610 | B2 | 9/2009 | Yoshida et al. |
| 9,649,000 | B2 * | 5/2017 | Jonsson ..................... B04C 5/04 |
| 2003/0037388 | A1 * | 2/2003 | Feyma .................. E01H 1/0854 15/79.2 |
| 2003/0226232 | A1 * | 12/2003 | Hayashi .................. A47L 5/362 15/353 |
| 2005/0229554 | A1 | 10/2005 | Oh et al. |
| 2007/0125049 | A1 * | 6/2007 | Menrik ................. A47L 9/1666 55/337 |
| 2009/0031524 | A1 * | 2/2009 | Courtney .............. A47L 9/1625 15/347 |
| 2010/0242421 | A1 | 9/2010 | Conrad et al. |
| 2011/0017236 | A1 * | 1/2011 | Jonsson ................ A47L 9/1625 134/21 |
| 2012/0080057 | A1 * | 4/2012 | Jonsson ................ A47L 9/1625 134/21 |
| 2014/0053368 | A1 * | 2/2014 | Gammack ............. A47L 9/1625 15/353 |
| 2016/0000283 | A1 * | 1/2016 | Hinchliffe ............. A47L 9/1658 15/353 |
| 2016/0123227 | A1 * | 5/2016 | Murray ................ B01D 50/002 55/337 |
| 2016/0341158 | A1 * | 11/2016 | Rosenfeld ........... F02M 35/086 |

FOREIGN PATENT DOCUMENTS

| | | |
|---|---|---|
| EP | 2 190 335 | 3/2012 |
| JP | 8-322768 | 12/1996 |
| JP | 2003-310502 | 11/2003 |
| JP | 2005-46417 | 2/2005 |
| JP | 2005-305114 | 11/2005 |
| JP | 2006-149942 | 6/2006 |
| JP | 2007-61199 | 3/2007 |
| JP | 2008-173261 | 7/2008 |
| JP | 2008-173262 | 7/2008 |
| JP | 2008-272020 | 11/2008 |
| JP | 2010-516381 | 5/2010 |
| JP | 2010-155173 | 7/2010 |
| JP | 2011-156345 | 8/2011 |
| KR | 2003-0029392 | 4/2003 |

OTHER PUBLICATIONS

International Search Report and Written Opinion dated Nov. 30, 2015, directed to International Application No. PCT/GB2015/052723; 9 pages.

Notice of Reasons for Rejection dated Oct. 29, 2018, directed to JP Application No. 2017-212625; 8 pages.

* cited by examiner

DOMESTIC CYCLONIC VACUUM CLEANER

REFERENCE TO RELATED APPLICATION

This application claims priority of United Kingdom Application No. 1417990.7, filed on Oct. 10, 2014, the entire contents of which are incorporated herein by reference.

FIELD OF THE INVENTION

The present invention relates to a domestic cyclonic vacuum cleaner.

BACKGROUND OF THE INVENTION

Domestic cyclonic vacuum cleaners comprise cyclonic separating apparatus for separating dust from the dirty airflow sucked into the vacuum cleaner, before the relatively clean air is then exhausted.

The separating apparatus may incorporate one or more cyclonic separation stages. In the case where more than one separation stages is provided, the separation stages are fluidly connected in series with one another so that the dirty airflow drawn into the separating apparatus passes in turn through each of the separation stages.

If two separation stages are provided, then the first (or 'primary') stage may be a low-efficiency stage intended primarily to remove the larger particles from the dirty airflow, and the second (or 'secondary') stage may be a higher efficiency stage intended primarily to remove the smaller particles from the airflow which have not been separated by the first stage.

The higher efficiency secondary stage will normally utilize smaller cyclone diameters than the lower efficiency primary stage. This is because a smaller diameter cyclone produces a higher cyclone velocity than a larger diameter cyclone and consequently subjects the dirt particles to a more aggressive centrifugal separating action. This is better for separating out smaller dirt particles.

The secondary stage may be multi-cyclonic comprising a plurality of cyclones arranged in parallel. This has the benefit of reducing the overall pressure drop across the secondary stage, which may otherwise be quite large because of the smaller cyclone diameters used in the secondary stage.

It is unusual for the primary stage to be multi-cyclonic. Instead, a single, large diameter cyclone is typically used for this first stage. However, multi-cyclonic primary stages do exist in the art, in which the first cyclonic separation stage consists of two identical, relatively large-diameter cyclones arranged in parallel with one another and the dirty airflow is divided equally between the two primary cyclones.

It would be advantageous to provide an improved cyclonic vacuum cleaner.

SUMMARY OF THE INVENTION

According to the present invention, there is provided a domestic cyclonic vacuum cleaner comprising a suction inlet fluidly connected in series to a vac-motor for drawing a dirty airflow in through the suction inlet, the suction inlet being fluidly connected downstream to both a first cyclonic separator and to a flow device, said fluid connection to the first cyclonic separator and to the flow device being via a flow junction for dividing the dirty airflow into two separate airflows, a first airflow passing through the first cyclonic separator and a second airflow passing through the flow device, the flow device being either a second cyclonic separator, an air filter or an air turbine, and wherein a screening member is provided upstream of the flow device for screening out coarse dirt particles from the second airflow so that the screened-out dirt particles are retained instead in the first airflow.

The flow junction diverts a fraction of the dirty airflow through the flow device (bypassing the first separator) so that only a remaining fraction of the dirty airflow actually goes through the first separator. In effect, the flow junction 'steps down' the flow through the first separator, so that the flow rate through the first separator is lower than the upstream flow rate through the cleaner head. This stepping down of the flow rate means that the separating apparatus design can better accommodate a mis-match between the optimal flow rate through the cleaner head (which tends to be relatively high for optimal pick-up performance) and the optimal flow rate through the first separator (which tends to be lower than the optimal flow rate through the cleaner head). Consequently, the stepped-down flow rate through the first separator is better optimized in relation to separation efficiency whilst the flow rate through the cleaner head is better optimized in relation to pick-up performance.

A fraction of the dirt is screened out of the second airflow by the screening member and is retained instead in the first airflow (the precise fraction will be determined by the cut size of the screening member). The screening member thus advantageously helps to maintain a relatively high solids loading at the inlet to the first cyclonic separator, despite the step down in flow through the first separator. This has a benefit for the separation efficiency of the first separator, particularly if, in accordance with a further embodiment, the first cyclonic dust separator has a tangential air inlet.

The screening member may be a woven mesh screen, an etched foil screen, a louvered grille or take any other form capable of performing the required screening function. Note that the screening member is not a filter—in the sense that it is not arranged and intended primarily to capture and retain dirt. The screening member is not itself intended to be a dust separator. Instead, the screen functions as a dust "concentrator", ensuring that the coarse dirt particles are concentrated in the first airflow and the fine dirt particles are concentrated in the second airflow.

The second airflow is directed through the flow device and so advantageously performs useful work—the second airflow is not simply directed through a bypass duct. In a preferred embodiment, the flow device is a second cyclonic separator having a smaller cut size than both the screening member and the first separator. In this arrangement, the second cyclonic separator targets only those particles which are small enough to pass through the screening member, and the screening member functions to prevent the second cyclonic separator from being overloaded by excessively large dirt particles (which are instead concentrated in the first airflow to help maximize the solids loading at the inlet to the first separator). In effect, the conventional two-stage series separation arrangement is advantageously incorporated instead in a single "combi-stage" of separation which incorporates aspects of both the conventional primary and secondary stages of separation. Thus, the conventional primary stage of separation is replaced by the first cyclonic separator whereas the secondary separation stage, conventionally operating in series with the primary stage, is instead replaced by the second cyclonic separator operating in parallel—not in series—with the first cyclonic separator. It is envisaged that a separating apparatus incorporating this parallel arrangement of non-identical first and second separators carries significant advantages in terms of energy efficiency versus a comparable-performing two-stage, series-connected separation arrangement.

The cut size of the first dust separator is preferably matched to the cut size of the screening member so that the first separator primarily targets those particles which do not pass through the screening member and are instead concentrated in the first airflow. Preferably, the cut size of the first dust separator X1 is substantially equal to the cut size Xs of the screening member, but in any event the cut size X1 of the first dust separator is preferably within ±30% of the cut size Xs of the screening member (0.7 Xs<X1<1.3 Xs).

A third dust separator may be provided which is connected in series to the first (or the second) separator and in parallel to the second (or, respectively, the first) separator. This third separator is preferably downstream of the first (or second) separator and is preferably configured to have a smaller cut size than the first (or second) separator so that it can remove small particles which have not been separated by the first (or second) separator. The third separator effectively forms an additional separator in the combi-stage of separation which works in series with the first separator but nevertheless works in parallel with the second separator (or vice versa). The third dust separator is preferably a cyclonic dust separator.

In one embodiment, the separating apparatus may comprise an additional, series separation stage provided downstream of the "combi-stage", which may be intended to remove very small particles from the airflow. This may comprise a cyclonic separator or a filter, or both and could effectively utilize the energy saved by the combi-stage.

Either the first cyclonic separator, second cyclonic separator, third separator or all of them or some of them, may be a multi-cyclonic separator.

The suction inlet may be connected to the first separator by a first duct, in which case the flow junction may comprise an opening in a wall of the duct. This is a simple, compact arrangement which can be implemented at low cost.

The screen may be provided across the opening, so that the airflow inside the duct air-scrubs the upstream face of the screen to help keep the screen clear.

The opening may be provided in a section of the duct which progressively reduces in cross-sectional area. The reducing cross-section of the duct compensates for airflow losses through the screen to help to maintain the scrubbing velocity of the airflow across the upstream face of the screen.

Though not essential, the flow resistance of the first separator may be designed such that a minority of the dirty airflow passes through the first separator and a majority of the dirty airflow passes through the second separator. The flow resistance of the first separator may be designed such that less than 33% of the dirty airflow passes through the first separator.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
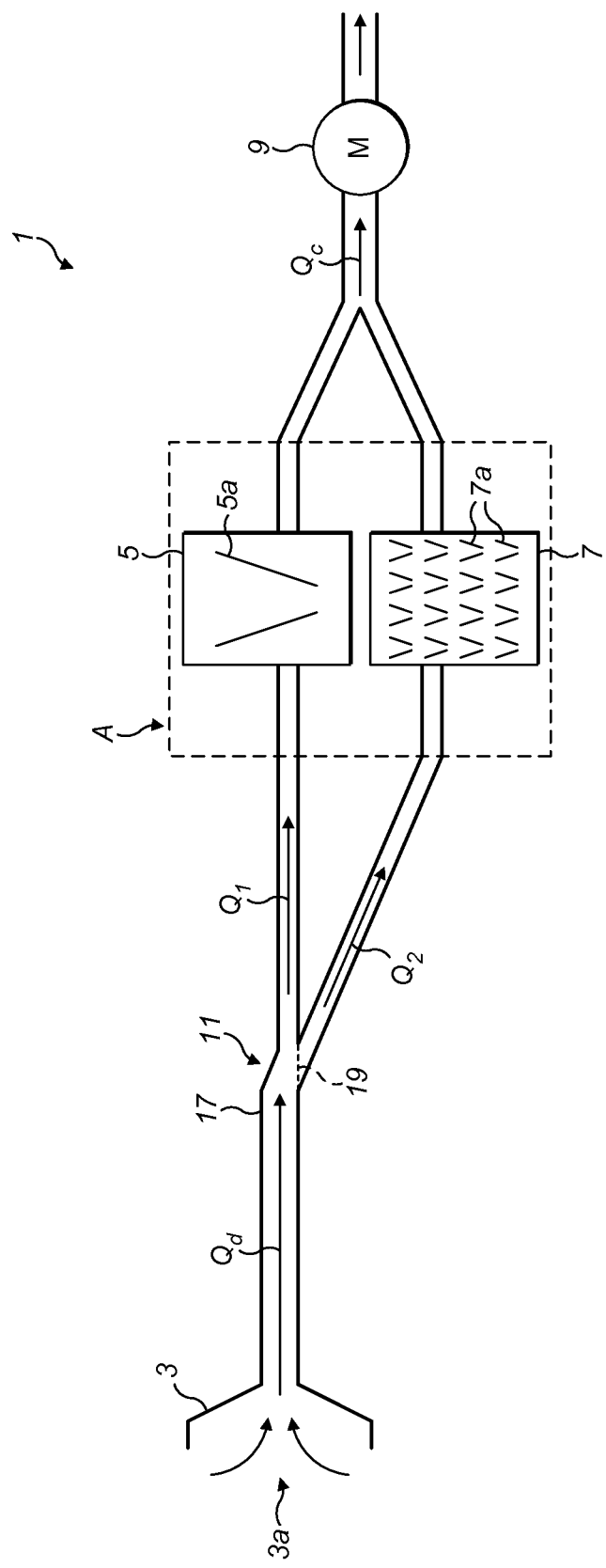
FIG. 1 is a schematic diagram illustrating the principal layout of a cyclonic vacuum cleaner in accordance with the invention.

The cyclonic vacuum cleaner 1 illustrated schematically in FIG. 1 comprises a cleaner head 3 having a suction inlet 3a, a first cyclonic separator 5, a second cyclonic separator 7 and a vac-motor 9. These components are fluidly connected together, via ducting, in a series-parallel arrangement (analogous to a 'combination circuit' in electrical circuitry) whereby the cleaner head 3 and vac-motor 9 are connected in series and the first separator 5 and second separator 7 are connected in parallel between the cleaner head 3 and the vac-motor 9. In operation therefore, the vac-motor 9 draws a dirty airflow Qd in through the suction inlet 3a on the cleaner head 3, which then divides into a first airflow Q1 passing through the first separator 5 and a second airflow Q2 passing through the second separator 7 before re-combining as a clean airflow Qc passing through the vac-motor 9.

The dirty airflow Qd divides into the first airflow Q1 and second airflow Q2 at a flow junction 11 provided upstream of the first separator 5 and the second separator 7.

Figure 2:
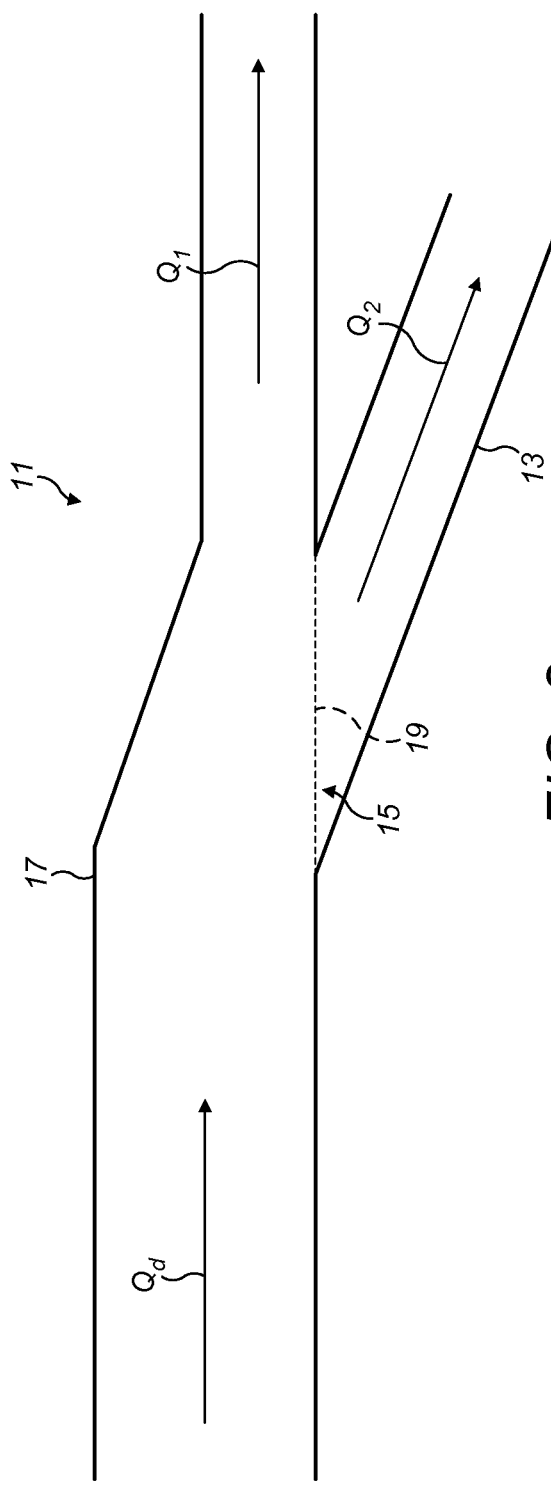
FIG. 2 is a schematic diagram illustrating in more detail a flow junction forming part of the layout in FIG. 1.

An enlarged view of the flow junction 11 is shown in FIG. 2. It comprises a branch duct 13 which branches off from an opening 15 in the wall of a main duct 17 carrying the dirty airflow Qd from the cleaner head 3. The main duct 17 connects to the inlet (not shown) of the first separator 5 and carries the first airflow Q1. The branch duct 13 connects to the inlet (not shown) of the second separator 7 and carries the second airflow Q2.

The relative flow restrictions presented by the first and second separator are arranged such that the majority of the flow—70% of the dirty airflow Qd—is diverted through the second separator 7. Only a relatively small fraction of the flow—the remaining 30% of the dirty airflow Qd—is sent through the first separator 5. Consequently, there is a significant step-down in the flow through the first separator 5, which helps optimize the flow rate through the first separator 5 whilst nevertheless maintaining a high flow rate through the suction inlet 3a on the cleaner head 3.

Figure 3:
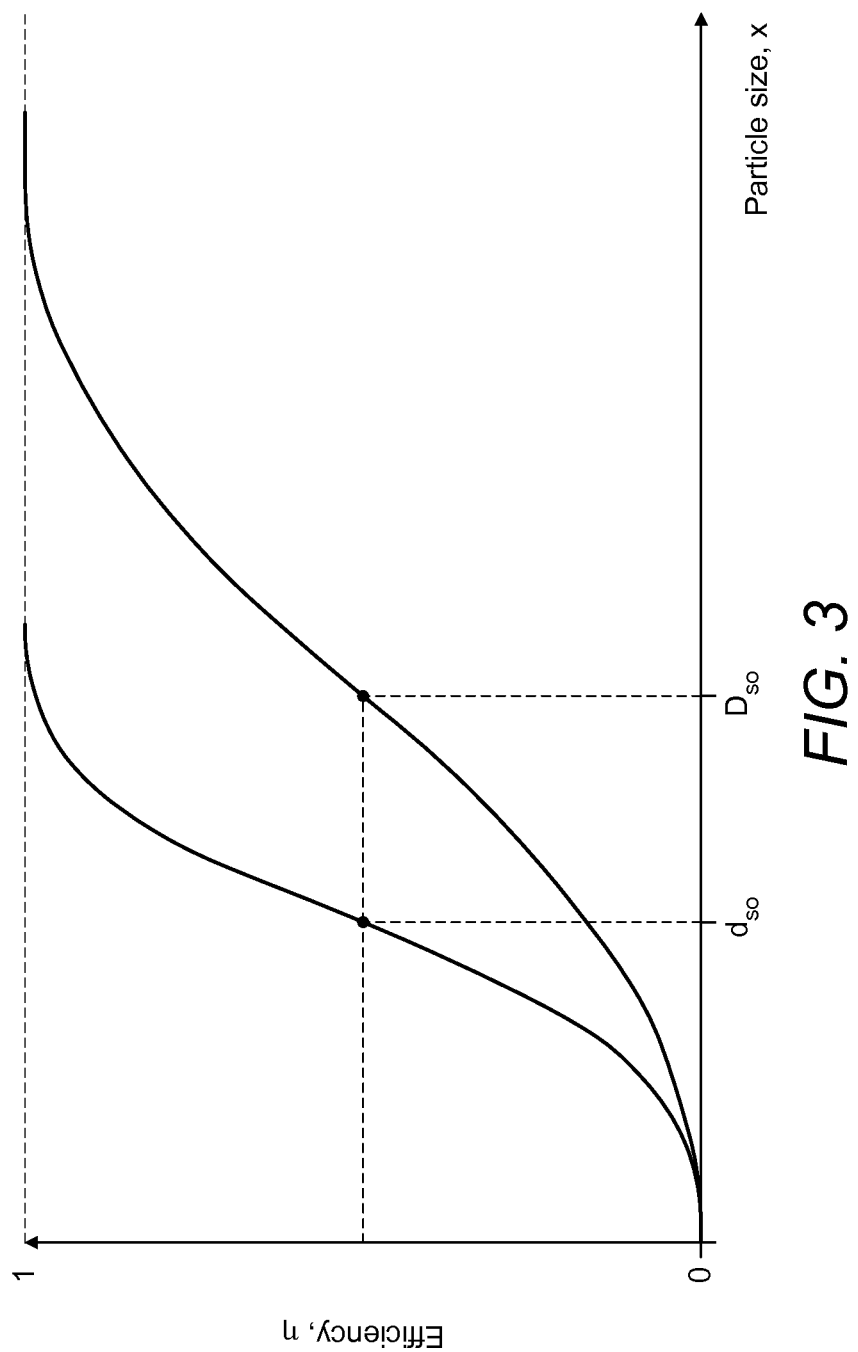
FIG. 3 is a graph illustrating the respective grade-efficiency curves for a first and second cyclonic separator forming part of the layout in FIG. 1.

The first separator 5 itself is of conventional design comprising a single, relatively large diameter, tangential-inlet cyclone 5a having a cut size D50 (see FIG. 3) and communicating with a first dust collector (not shown).

The second separator 7 is likewise of conventional design comprising a plurality of relatively small diameter, parallel cyclones 7a each having a cut size d50 (see FIG. 3) and each communicating with a second dust collector (not shown).

The cut size d50 is smaller than the cut size D50, so that the smaller cyclones 7a in the second separator 7 are better able than the larger cyclone 5a in the first separator 5 to separate out smaller particles from the dirty airflow.

A screening member in the form of a mesh screen 19 is provided across the opening 15 in the wall 17. The mesh screen 19 is of conventional woven construction. A different screening member may be used, for example an etched foil mesh or a louvered grille.

In operation, the mesh screen 19 functions to screen out coarse dirt particles from the second airflow Q2 so that they are retained instead in the first airflow Q2. This 'concentrates' the coarse dirt in the first airflow Q2, advantageously increasing the solids loading at the tangential inlet to the first separator 5 to help maximize separation efficiency. The cut size Xs of the mesh screen 19 is matched to the cut size D50 of the first separator 5 so that the first separator 5 is effectively tuned to target the coarse dirt which is screened out by the mesh screen 19 and which therefore remains in the first airflow Q1.

At the same time, the mesh screen 19 operates to reduce overloading of the second separator 7 by relatively large dirt particles, instead, the second separator 7 is loaded only with fine dirt particles which, by virtue of their size, have passed through the mesh screen 19.

The first and second separators 5, 7 thus together constitute a single stage of separation (denoted A in FIG. 1), but incorporating two parallel separation paths, a "coarse dirt" path through the first separator 5 and a "fine dirt" path through the second separator 7. In this manner, the arrangement effectively combines aspects of a conventional two-stage series separation system in a single, energy-efficient "combi-stage", the conventional primary cyclonic stage is replaced by the first cyclonic separator 5, and the conventional secondary cyclonic stage is replaced, at least in part, by the second cyclonic separator 7 operating in parallel—not in series—with the first cyclonic separator 5. This is made possible by the provision of the mesh screen 19.

The mesh screen 19 is air-scrubbed continuously by the airflow in the main duct 17, to help keep the mesh screen 19 clean. In order to promote good scrubbing, the main duct 17 narrows in the region of the mesh screen 19 to maintain the scrubbing velocity across the upstream surface of the mesh screen 19.

In alternative embodiments the second cyclonic separator 7 may be replaced by a different flow device altogether, such as an air turbine or air filter. In these arrangements, the "excess" airflow through the cleaner head (i.e. in excess of the desired optimal flow at the inlet to the first separator 5) is still used advantageously to perform useful work in parallel with the first separator 5.

The flow junction 11, first separator 5 and flow device (e.g. second separator 7) may alternatively be placed downstream of the vac-motor 9, so that the vac-motor 'pushes' the dirty airflow through the first separator 5 and the flow device.

In an alternative embodiment (not illustrated) the outlet of the first cyclonic separator 5 may be connected to the inlet of the flow device. So, for example, the outlet of the first cyclonic separator 5 may be connected to the inlet of the second cyclonic separator 7. In this arrangement, the dirt particles not separated by the first cyclonic separator 5 may be separated by the second cyclonic separator 7. Care must be taken here not to overload the second cyclonic separator 7 with coarse dirt particles, this may be achieved by appropriately tuning the cut sizes D50 and d50.

Figure 4:
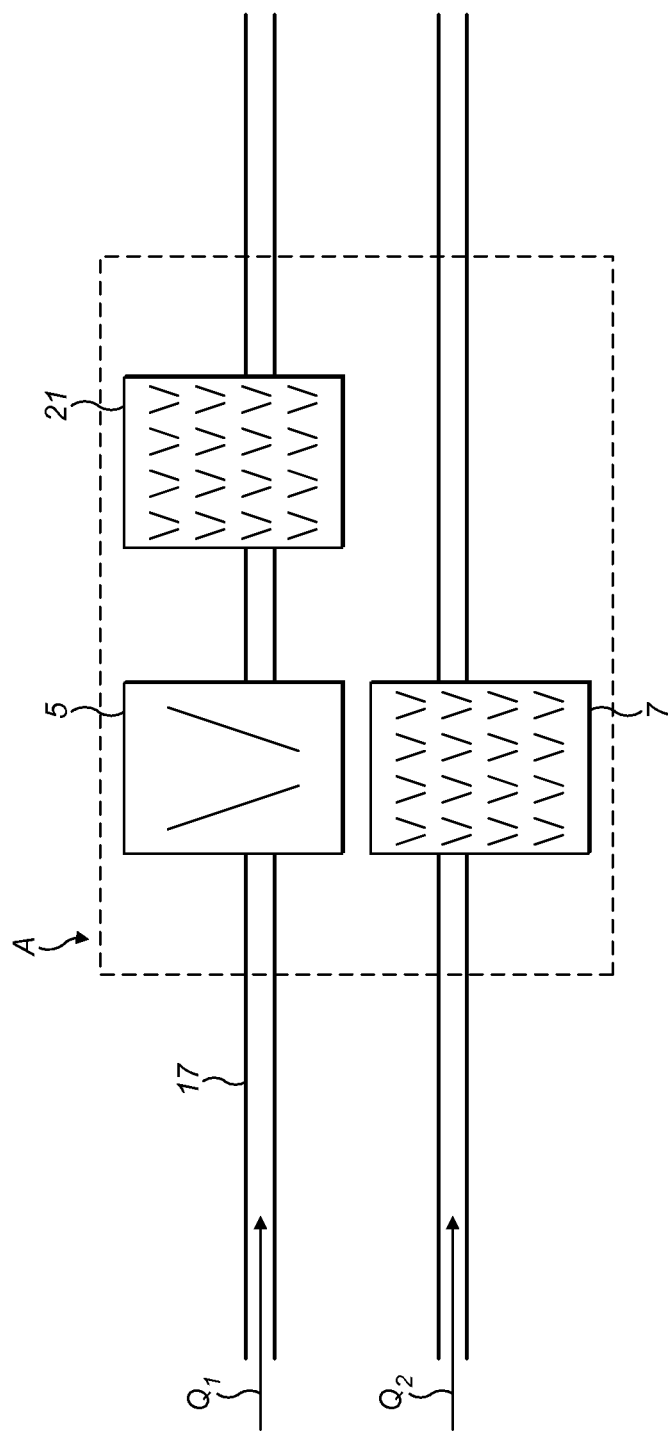
FIG. 4 is a schematic diagram illustrating series connection of a first and third cyclonic separator.
Figure 5:
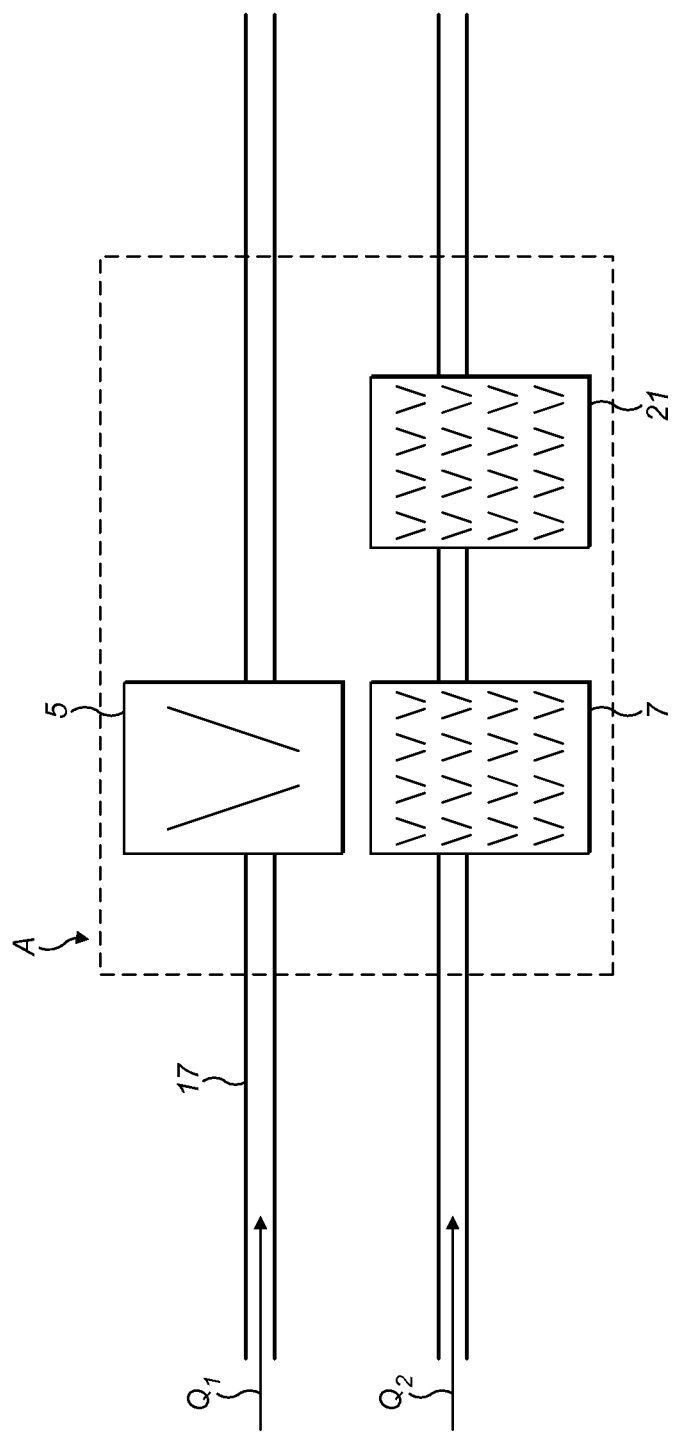
FIG. 5 is a schematic diagram illustrating series connection of a second and third cyclonic separator.

A third cyclonic separator may be provided downstream of either the first cyclonic separator or the second cyclonic separator. For example, a third cyclonic separator 21 may be located in series with the first separator 5, downstream of the first separator 5, to remove some of the dirt particles which are not separated by the first separator 5 (see FIG. 4). A third cyclonic separator 21 may alternatively (or additionally) be positioned in series with the second cyclonic separator, downstream of the second separator (see FIG. 5). The third separator forms part of the same "combi-stage" A which comprises the first and second separators 5,7, and the third cyclonic separator 21 advantageously makes use of a parallel connection with either the first or second cyclonic separator 5, 7 (as the case may be) in order to help minimize the total pressure drop across the "combi-stage" A.

Although not illustrated, an additional separation stage may be connected in series with the "combi-stage" A, downstream of the combi-stage A, to remove particles—possibly very small particulates—not removed by the combi-stage A. This additional separation stage may be cyclonic, or may comprise one or more air filters.

The invention claimed is:

1. A domestic cyclonic vacuum cleaner comprising a suction inlet fluidly connected in series to a vac-motor for drawing a dirty airflow in through the suction inlet, the suction inlet being fluidly connected downstream to both a first cyclonic separator and to a flow device, said fluid connection to the first cyclonic separator and to the flow device being via a flow junction for dividing the dirty airflow into two separate airflows: a first airflow passing through the first cyclonic separator and a second airflow passing through the flow device; the flow device being either a second cyclonic separator or an air turbine, and wherein a screening member is provided upstream of the flow device and comprises a plurality of apertures that are configured for screening out dirt particles based on size from the second airflow so that the screened-out dirt particles are retained instead in the first airflow.

2. The domestic cyclonic vacuum cleaner of claim 1, wherein the first cyclonic separator has a tangential air inlet.

3. The domestic cyclonic vacuum cleaner of claim 1, wherein the first cyclonic separator and the flow device are both upstream of the vac-motor.

4. The domestic cyclonic vacuum cleaner of claim 1, wherein the flow device is a second cyclonic separator, the second cyclonic separator being arranged to have a smaller cut size than the first cyclonic separator for separating out from the second airflow fine dirt particles which, by virtue of particle size, have passed through the screening member.

5. The domestic cyclonic vacuum cleaner of claim 4, wherein a third cyclonic separator is connected in series to either the first cyclonic separator or the second cyclonic separator, the third cyclonic separator also being connected in parallel to the second cyclonic separator when connected in series to the first cyclonic separator or in parallel to the first cyclonic separator when connected in series to the second cyclonic separator.

6. The domestic cyclonic vacuum cleaner of claim 5, wherein the third cyclonic separator is downstream of the first cyclonic separator when connected in series to the first cyclonic separator or downstream of the second cyclonic separator when connected in series to the second cyclonic separator.

7. The domestic cyclonic vacuum cleaner of claim 6, in which the third cyclonic separator has a smaller cut size than the first cyclonic separator when connected in series to the first cyclonic separator or a smaller cut size than the second cyclonic separator when connected in series to the second cyclonic separator.

8. The domestic cyclonic vacuum cleaner of claim 1, wherein the suction inlet is connected to the first separator by a first duct and the flow junction comprises an opening in a wall of the duct.

9. The domestic cyclonic vacuum cleaner of claim 8, wherein the screening member is provided across the opening.

10. The domestic cyclonic vacuum cleaner of claim 9, wherein the opening is provided in a section of the first duct which progressively reduces in cross-sectional area.

11. The domestic cyclonic vacuum cleaner of claim 1, in which the cut size $X_1$ of the first cyclonic separator is within ±30% of the cut size $X_s$ of the screening member (0.7 $X_s < X_1 < 1.3 X_s$).

12. The domestic cyclonic vacuum cleaner of claim 1, wherein screening member is configured so that coarser dirt particles are concentrated in the first airflow and finer dirt particles are concentrated in the second airflow.

13. A domestic vacuum cleaner comprising a suction inlet fluidly connected in series to a vac-motor for drawing a dirty airflow in through the suction inlet, the suction inlet being fluidly connected downstream to both a first dust separator and to a flow device, said fluid connection to the first dust separator and to the flow device being via a flow junction for dividing the dirty airflow into two separate airflows: a first airflow passing through the first dust separator and a second airflow passing through the flow device; the flow device being either a second dust separator or an air turbine, and wherein a screening member is provided upstream of the flow device and comprises a plurality of apertures that are configured for screening out dirt particles based on size from the second airflow so that the screened-out dirt particles are retained instead in the first airflow.

\* \* \* \* \*